US008291733B2

(12) United States Patent
Chiou et al.

(10) Patent No.: US 8,291,733 B2
(45) Date of Patent: Oct. 23, 2012

(54) ELECTRIC DOOR LOCK

(75) Inventors: Ming-Shyang Chiou, Chiayi (TW); Chia-Min Sun, Chiayi (TW); Yu-Ting Huang, Chiayi (TW); Yu-Le Lin, Yunlin County (TW)

(73) Assignee: Tong Lung Metal Industry Co., Ltd., Chia-Yi (TW)

( * ) Notice: Subject to any disclaimer, the term of this patent is extended or adjusted under 35 U.S.C. 154(b) by 247 days.

(21) Appl. No.: 12/888,122

(22) Filed: Sep. 22, 2010

(65) Prior Publication Data

US 2011/0067464 A1 Mar. 24, 2011

(30) Foreign Application Priority Data

Sep. 24, 2009 (TW) ................................ 98217614 U

(51) Int. Cl.

| | |
|---|---|
| ***B60R 25/02*** | (2006.01) |
| ***E05B 49/00*** | (2006.01) |
| ***E05B 47/00*** | (2006.01) |
| ***E05B 35/10*** | (2006.01) |
| ***E05B 1/00*** | (2006.01) |
| ***E05C 19/00*** | (2006.01) |

(52) U.S. Cl. .......... 70/224; 70/278.1; 70/279.1; 70/280; 70/432; 292/347; 292/279

(58) Field of Classification Search .................... 70/210, 70/215, 221, 222, 223, 224, 277, 278.1, 278.7, 70/279.1, 280, 281, 282, 432; 292/347, 348, 292/144, 169, 279, DIG. 61, 142
See application file for complete search history.

(56) References Cited

U.S. PATENT DOCUMENTS 7,516,633 B1 * 4/2009 Chang .............................. 70/472

* cited by examiner

*Primary Examiner* — John R Olszewski
*Assistant Examiner* — Duoni Pan
(74) *Attorney, Agent, or Firm* — Chun-Ming Shih

(57) ABSTRACT

An electric door lock includes a transmission wheel driven by a motor and incorporating a spring with a driving end to drive a driven wheel. The transmission wheel and the driven wheel are rotatably sleeved around an inner drive tube connected to an inner handle. A spindle is inserted into the inner drive tube and has an operating end exposed from the inner handle. The driven wheel is connected integrally to the spindle for rotation. Preferably, a coupling piece extends through an arc-shaped slot in the inner drive tube and interconnects the driven wheel and the spindle.

14 Claims, 15 Drawing Sheets

ELECTRIC DOOR LOCK

CROSS-REFERENCE TO RELATED APPLICATION

This application claims priority of Taiwanese Utility Model Application No. 098217614, filed on Sep. 24, 2009, the disclosure of which is herein incorporated by reference.

BACKGROUND OF THE INVENTION

1. Field of the Invention

This invention relates to a door lock, more particularly to an electric door lock which functions both manually and electrically.

2. Description of the Related Art

Generally, the designs of door locks are directed towards simplicity, convenience, as well as enhancement for security. A mechanical door lock operated by a key is sometimes inconvenient because the user may not have the key in hand. Although an electric door lock operated electrically is relatively convenient, the electric system and transmission mechanism are complicated in structure, which causes a higher manufacturing cost.

SUMMARY OF THE INVENTION

An object of the present invention is to provide an electric door lock which can be operated either manually or electrically and which has a simple construction that is easy to fabricate at a relatively low manufacturing cost.

According to one aspect of this invention, the electric door lock includes: a latch unit; an inner handle; an inner drive tube inserted into the inner handle; an outer handle; an outer drive tube inserted into the outer handle; a key-operated lock mounted inside the outer drive tube; a spindle inserted into the inner drive tube and the inner handle and including an operating end exposed from an inner end of the inner handle; a middle drive tube having two ends connected respectively to the inner and outer drive tubes, and extending through the latch unit so as to move the latch unit; an operating shaft extending through the middle drive tube, and having an inner end connected drivenly to the spindle and an outer end connected drivenly to the key-operated lock; a motor; a transmission wheel rotatably sleeved around the inner drive tube and connected drivenly to the motor; a spring attached to the transmission wheel and having at least one driving end; and a driven wheel rotatably sleeved around the inner drive tube in proximity to the transmission wheel, and having a driven element driven by the driving end, the driven wheel being connected integrally to the spindle for rotation.

According to another aspect of this invention, the electric door lock includes: an inner handle; an inner drive tube inserted into the inner handle; a spindle inserted into the inner drive tube and including an operating end exposed from the inner handle; a motor; a drive wheel connected drivenly to the motor; a transmission wheel rotatably sleeved around the inner drive tube and connected drivenly to the drive wheel; a spring attached to the transmission wheel and having two angularly spaced apart driving ends; and a driven wheel rotatably sleeved around the inner drive tube in proximity of the transmission wheel, and having a driven element disposed between and driven by the driving ends, the driven wheel being connected integrally to the spindle for rotation.

According to still another aspect of this invention, the electric door lock includes: an inner handle; an inner drive tube inserted into the inner handle; a spindle inserted into the inner drive tube, and including an operating end exposed from the inner handle, a connecting end opposite to the operating end and staying within the inner drive tube, and an insertion hole that opens at the connecting end and that extends from the connecting end towards the operating end; a motor; a transmission wheel rotatably sleeved around the inner drive tube and connected drivenly to the motor; a spring attached to the transmission wheel and having at least one driving end; and a driven wheel including an annular disc that defines a sleeve hole and that is rotatably sleeved around the inner drive tube in proximity to the transmission wheel, a driven element disposed on the annular disc and driven by the driving end, and a coupling piece projecting from an inner periphery of the annular disc, extending through the inner drive tube, and connected integrally to the connecting end of the spindle.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
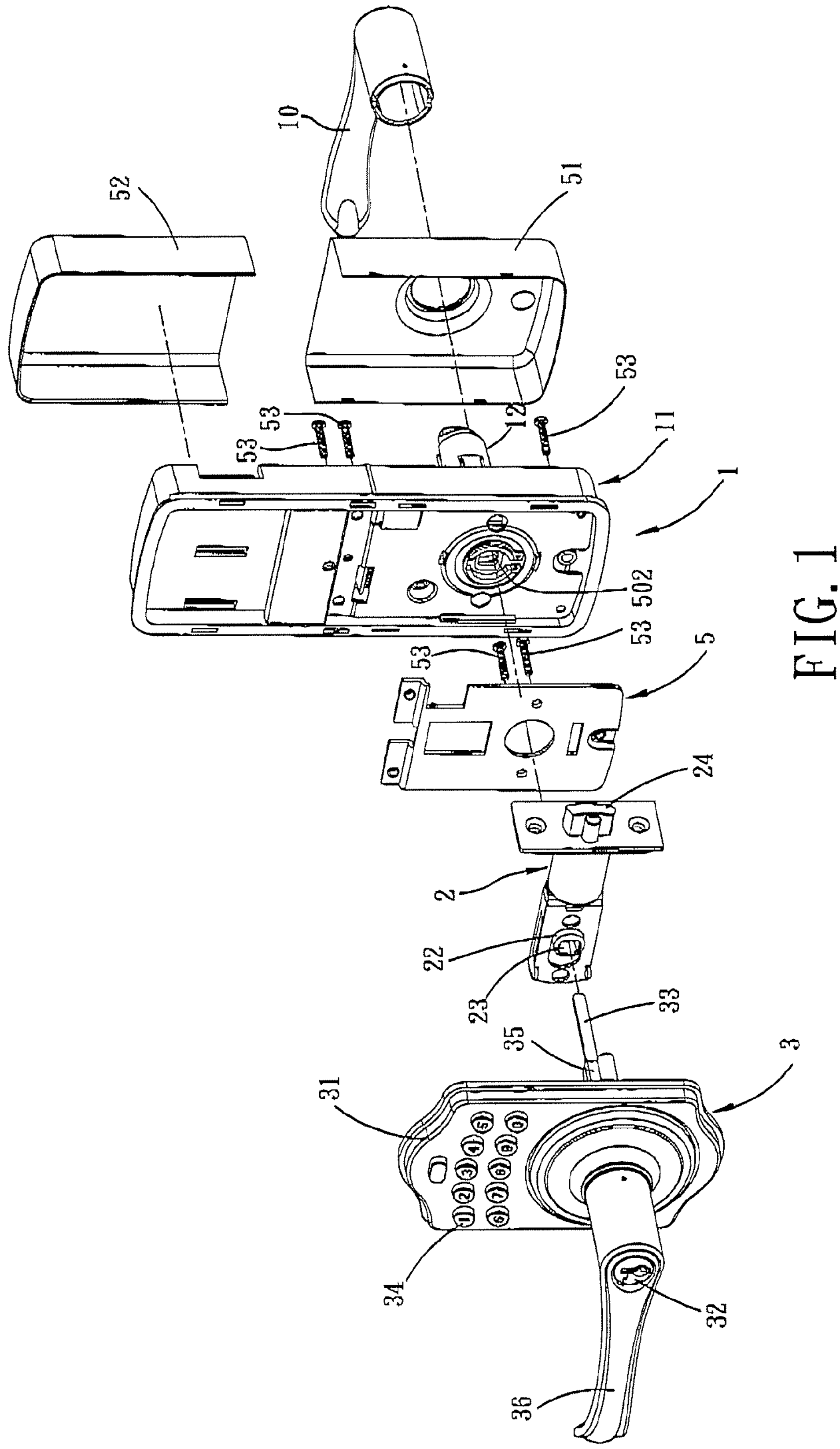
FIG. 1 is an exploded perspective view of an electric door lock according to a preferred embodiment of this invention.
Figure 2:
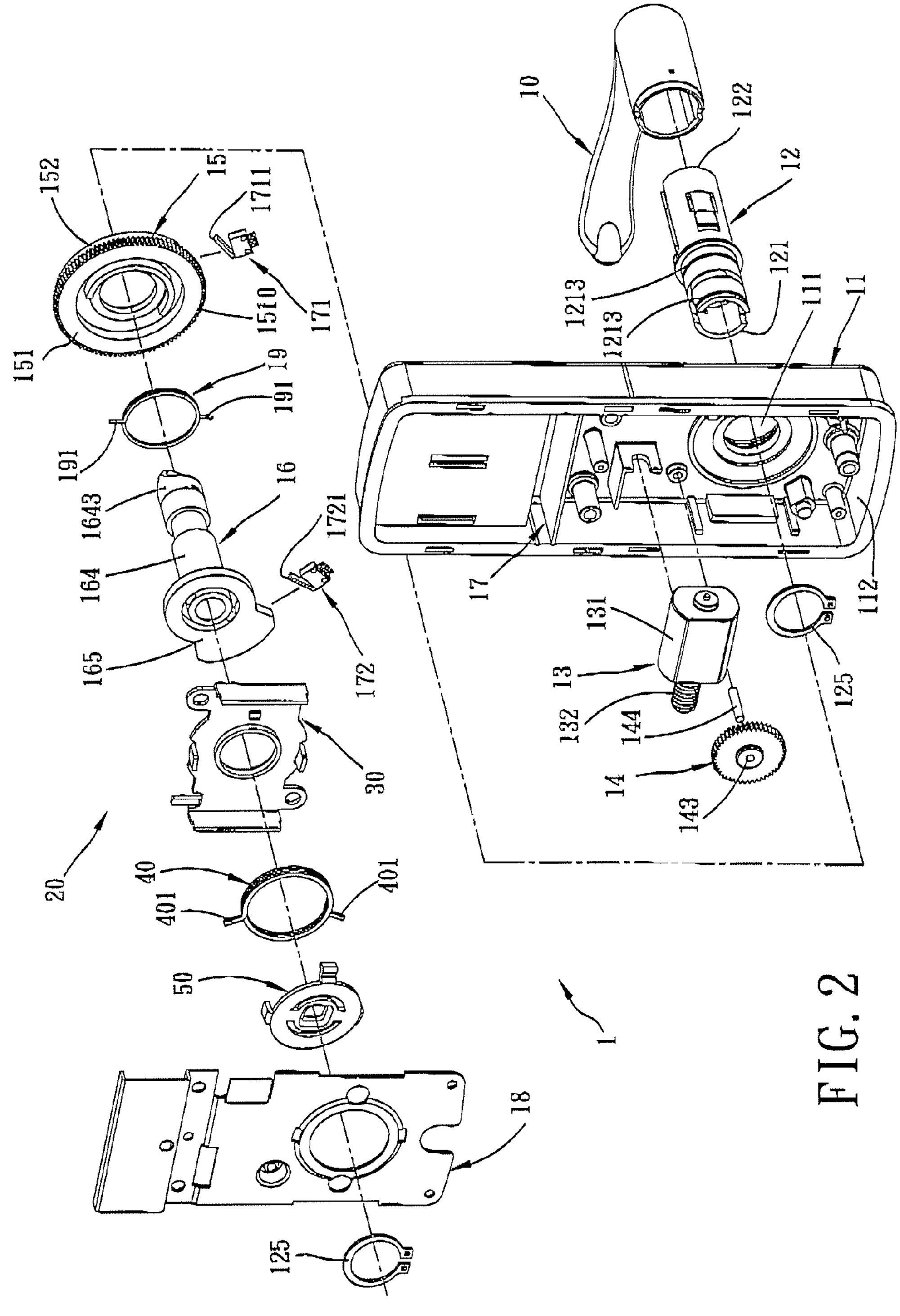
FIG. 2 is an exploded perspective view of an inside lock assembly of the preferred embodiment.

Referring to FIGS. 1 and 2, the preferred embodiment of an electric door lock according to the present invention is shown to comprise a housing 11, an inner drive tube 12, a drive unit 13, a transmission wheel 15, a torsion spring 19, a driven wheel unit 16, an electronic control unit 17, a torque restoring mechanism 20, and a frame 18.

The housing 11 has a through hole 111 and a receiving space 112.

Figure 8:
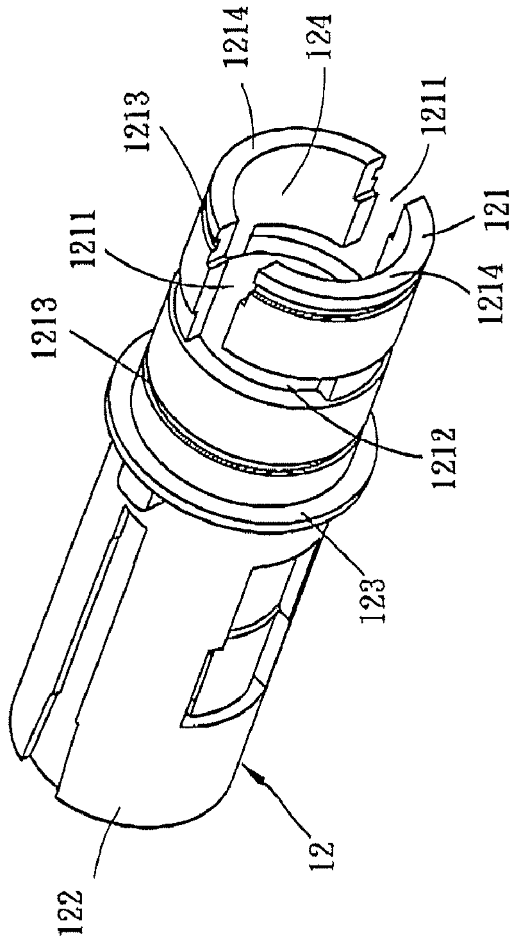
FIG. 8 is a perspective view of an inner drive tube of the preferred embodiment.

Referring to FIGS. 2 and 8, the inner drive tube 12 defines an axially extending hole 124, and has first and second ends 121,122, an annular flange 123 therebetween, two axial slots 1211 opening at the first end 121 and extending axially towards the second end 122, and two arc-shaped slots 1212 extending circumferentially near the first end 121 and communicated with the axial slots 1211, respectively. In addition, two spaced apart annular grooves 1213 are formed in an outer surrounding surface near the first end 121. The first end 121 extends through the through hole 111 and a snap ring 125 engages one of the annular grooves 1213 near to the annular flange 123. The second end 122 is inserted into an inner handle 10.

Figure 3:
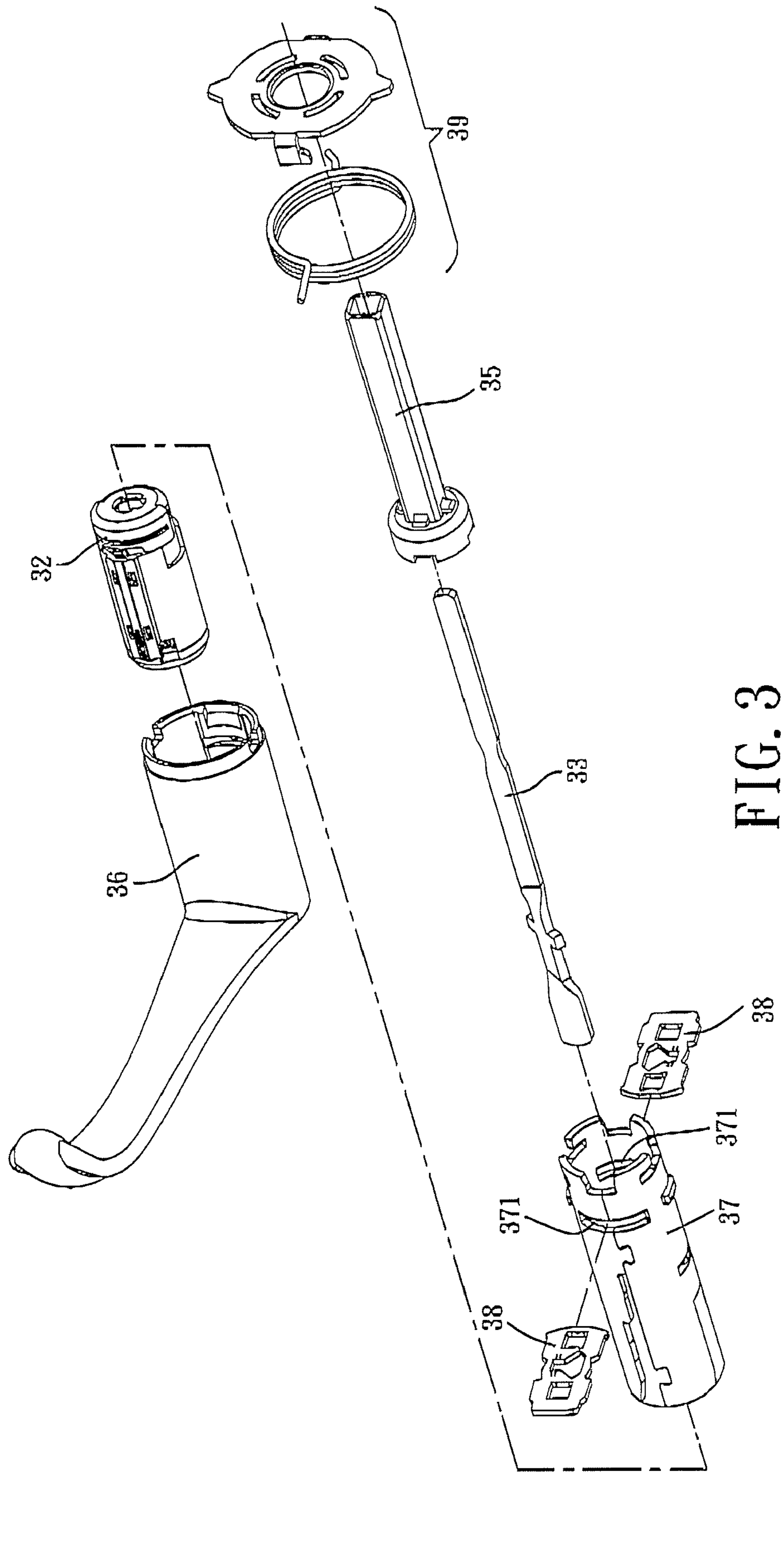
FIG. 3 is an exploded view of a portion of an outside lock assembly of the preferred embodiment.
Figure 4:
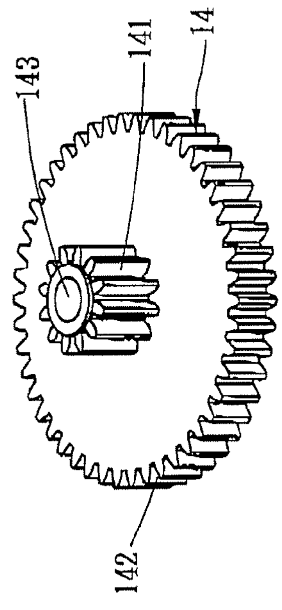
FIG. 4 is a perspective view of a drive wheel of the preferred embodiment.

The drive unit 13 is mounted within the receiving space 112, and includes a reversible motor 131, a worm 132, and a drive wheel 14. Referring to FIGS. 2 to 4, the drive wheel 14 has a small gear 141 integral with a large gear 142 which is meshed with the worm 132 for speed reduction. A spindle 144 is journalled in a central hole 143 of the drive wheel 14 so that the drive wheel 14 is rotatable within the receiving space 112.

Referring to FIGS. 2, 5A, 5B and 8, the transmission wheel 15 has a central hole 1511 to be rotatably sleeved around the inner drive tube 12, and gear teeth 1510 formed on a peripheral portion thereof and meshed with the small gear 143 of the drive wheel 14 for speed reduction. Accordingly the transmission wheel 15 is connected drivenly to the motor 131. A first face 151 of the transmission wheel 15 has an annular recess 1515 around the central hole 1511, and an arc-shaped rib 1512 formed within the annular recess 1515 to divide a portion of the annular recess 1515 into first and second arc-shaped grooves 1514,1517. Two angularly spaced apart opposite ends of the arc-shaped rib 1512 are used as bearing faces 1516. The transmission wheel 15 has two angularly spaced apart first arcuate projections 1523 formed circumferentially at different angular positions near a second face 152, and first and second cutouts 1522,1524 formed respectively between the first arcuate projections 1523.

Figure 5B:
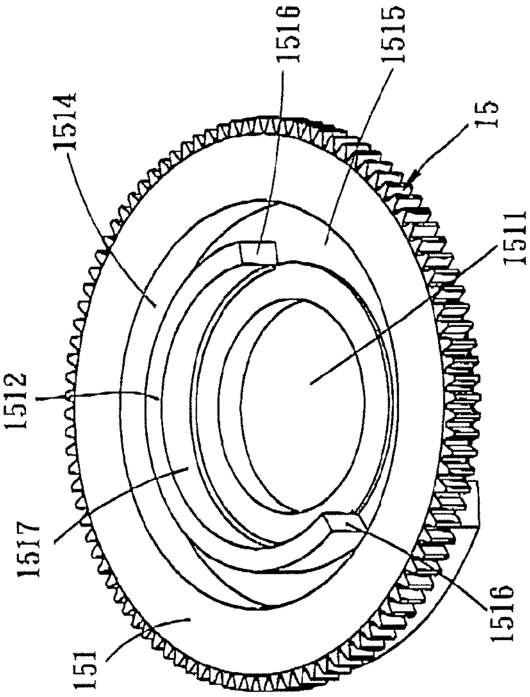
FIG. 5B is another perspective view of the transmission wheel.
Figure 5A:
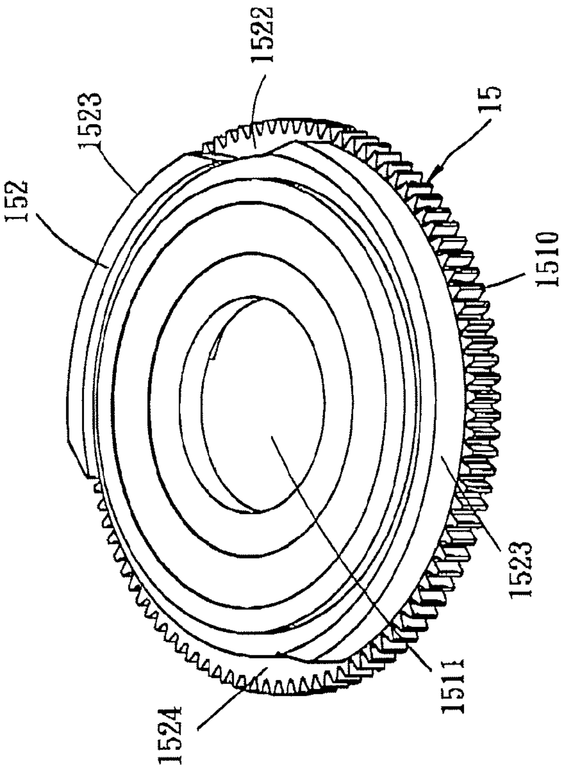
FIG. 5A is a perspective view of a transmission wheel of the preferred embodiment.
Figure 7:
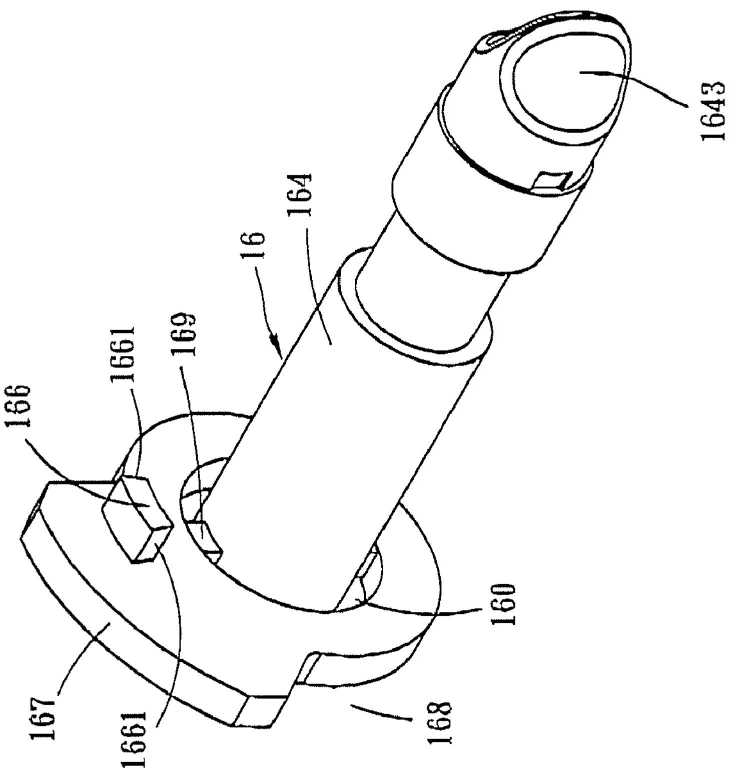
FIG. 7 is another perspective view of the spindle and the driven wheel.
Figure 6:
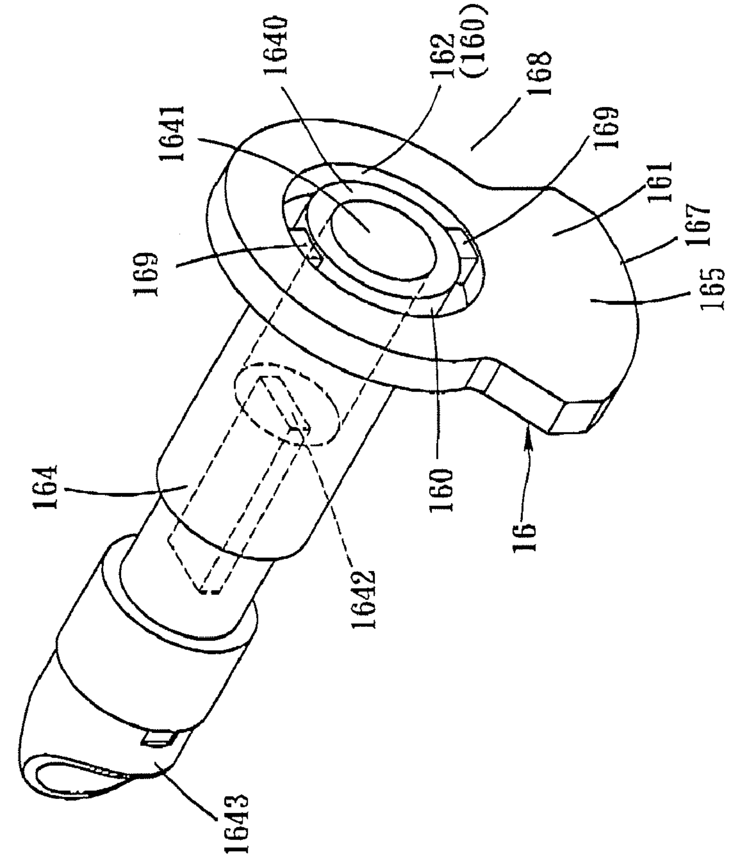
FIG. 6 is a perspective view of a spindle and a driven wheel of the preferred embodiment.

Referring to FIGS. 2, 5A and 5B, the torsion spring 19 is disposed within the annular recess 1515 and the second arc-shaped groove 1517. The torsion spring 19 has two angularly spaced apart driving ends 191 bent to abut against the two bearing faces 1516, respectively.

Referring to FIGS. 2, 5A, 5B, 6, 7, 8 and 12, the driven wheel unit 16 includes a spindle 164 and a driven wheel 165 that are interconnected for rotation. The spindle 164 is inserted into the inner drive tube 12 and the inner handle 10, and the driven wheel 165 is sleeved rotatably around the inner drive tube 12. The spindle 164 includes an operating end 1643 exposed from an inner end of the inner handle 10, a connecting end 1640 that is opposite to the operating end 1643 and that stays within the inner drive tube 12. The driven wheel 165 includes an annular disc 161 that has an inner periphery defining a sleeve hole 162, and two coupling pieces 169 projecting from the inner periphery into the sleeve hole 162. The connecting end 1640 of the spindle 164 extends into the sleeve hole 162 such that two gaps 160 are formed between the inner periphery and the connecting end 1640. The coupling pieces 169 extend through the gaps 160 and are connected integrally to the connecting end 1640. The coupling pieces 169 may be formed as one piece with the annular disc 161 and the connecting end 1640 of the spindle 164. Two arcuate portions 1214 (as shown in FIG. 8) of the inner drive tube 12 at the first end 121 extend respectively through the gaps 160. The coupling pieces 169 extend substantially radially through the arc-shaped slots 1212, respectively, and are rotatable limitedly therein. Therefore, the driven wheel 165 and the inner drive tube 12 are rotatable relative to each other by a predetermined angle. The second end 122 of the inner drive tube 12 is disposed proximate to the operating end 1643 of the spindle 164. Further, the spindle 164 includes an insertion hole 1641 that opens at the connecting end 1640 and that includes a rectangular hole section 1642. The driven wheel 165 further includes a block 166 axially protruding from the annular disc 161 and having two opposite driven faces 1661 that are used as driven elements, and a second arcuate projection 167 and an arcuate cutout 168 which are formed circumferentially on the periphery of the annular disc 161 at different angular positions. When the transmission wheel 15 is rotated, one of the driving ends 191 of the torsion spring 19 pushes a corresponding one of the driven faces 1661 of the block 166 so as to rotate the driven wheel unit 16.

Referring to FIGS. 2, 5A, 5B, 11 and 12, the electronic control unit 17 includes first and second sensor switches 171,172 received in the receiving space 112, and a control circuit (not shown) connected electrically to the sensor switches 171,172. The first sensor switch 171 is used to control activation and deactivation of the motor 131, and the second sensor switch 172 is used to control clockwise and counterclockwise rotational movements of the motor 131. For example, when the first and second cutouts 1522,1524 of the transmission wheel 15 are registered with a contact 1711 of the first sensor switch 171, the contact 1711 is not pressed so that the motor 131 stops its rotation. When the first arcuate projection 1523 of the transmission wheel 15 is registered with the contact 1711 of the first sensor switch 171, the contact 1711 is pressed and the motor 131 is activated to rotate. On the other hand, when the second arcuate projection 167 of the driven wheel 165 is registered with and presses a contact 1721 of the second sensor switch 172, the motor 131 rotates in one direction (e.g. in a clockwise direction). When the arcuate cutout 168 of the driven wheel 165 is registered with but does not press the contact 1721, the motor 131 rotates in an opposite direction (e. g. in a counterclockwise direction).

Referring to FIGS. 2 and 8, the torque restoring mechanism 20 is received in the receiving space 112, and is disposed at the first end 121 of the inner drive tube 12. The torque restoring mechanism 20 includes a mount 30, a torsion spring 40, and a rotary plate 50.

Figure 9:
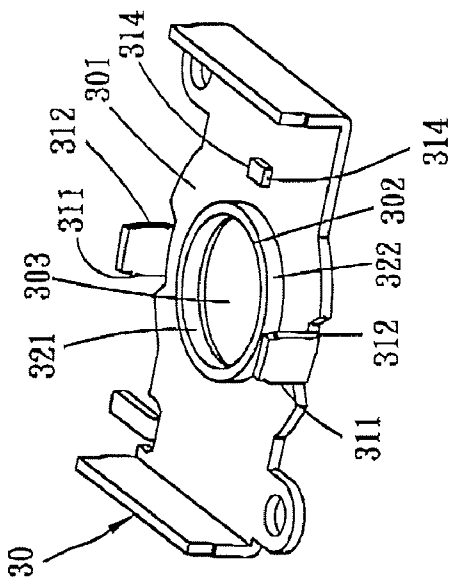
FIG. 9 is a perspective view of a mounting plate of the preferred embodiment.
Figure 11:
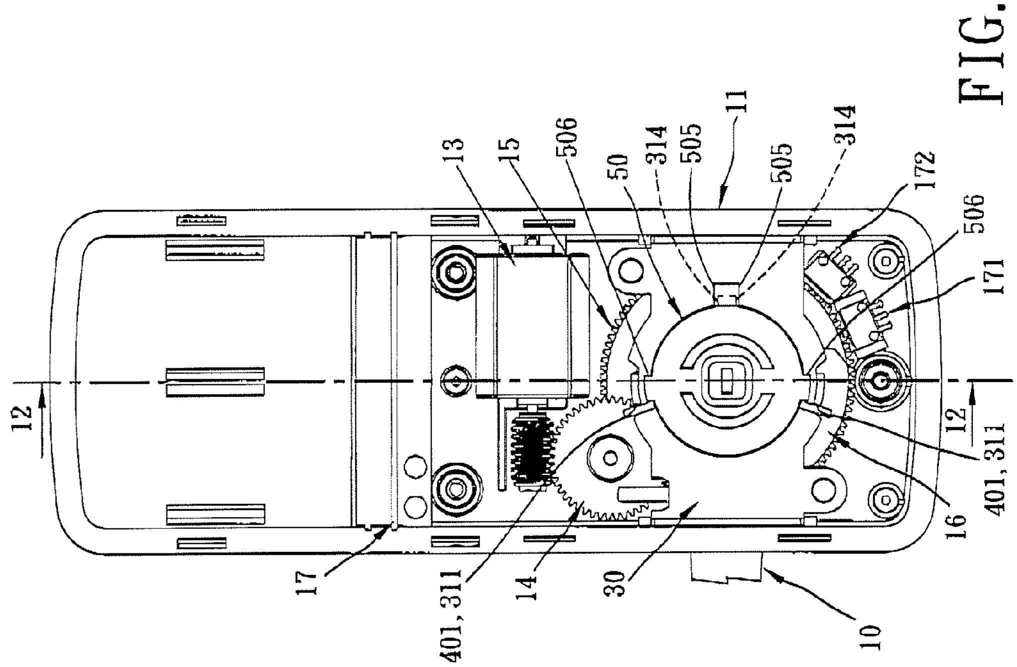
FIG. 11 is an elevation view showing the drive wheel and the transmission wheel in an assembled state.

Referring to FIGS. 2, 9 and 11, the mount 30 has a base plate 301, a tubular protrusion 302, two spaced apart bearing portions 311, two spaced apart first stop portions 312, and two spaced apart second stop portions 314. The tubular protrusion 302 has an inner tubular surface 321 defining a central hole 303, and an outer tubular surface 322. The torsion spring 40 is sleeved around the outer tubular surface 322 of the tubular protrusion 302, and has two legs 401 abutting against the bearing portions 311, respectively.

Figure 10:
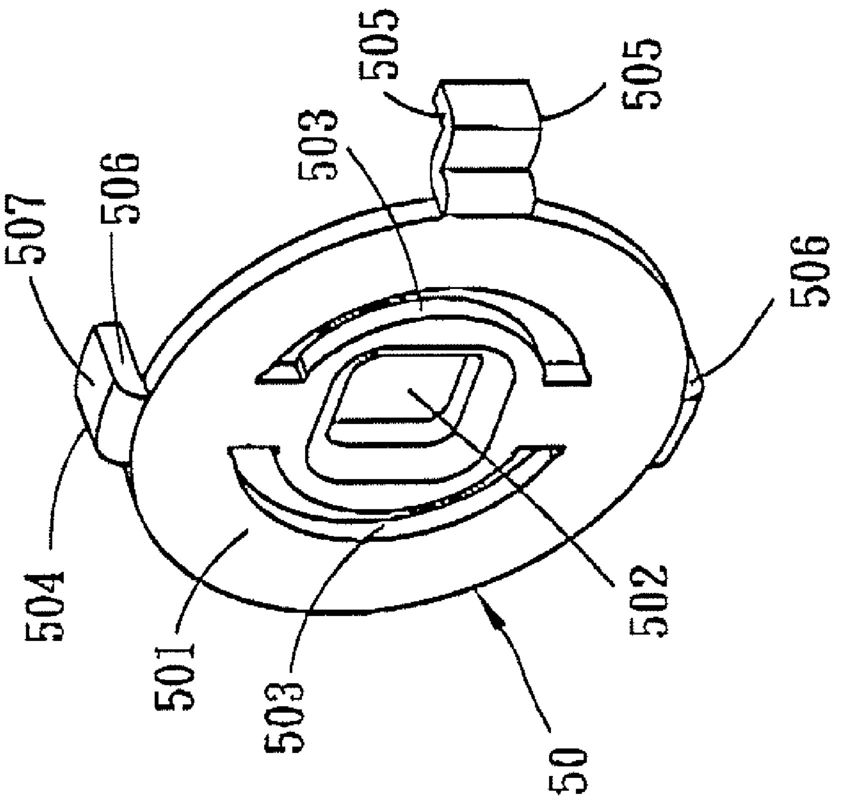
FIG. 10 is a perspective view of a rotary plate of the preferred embodiment.
Figure 12:
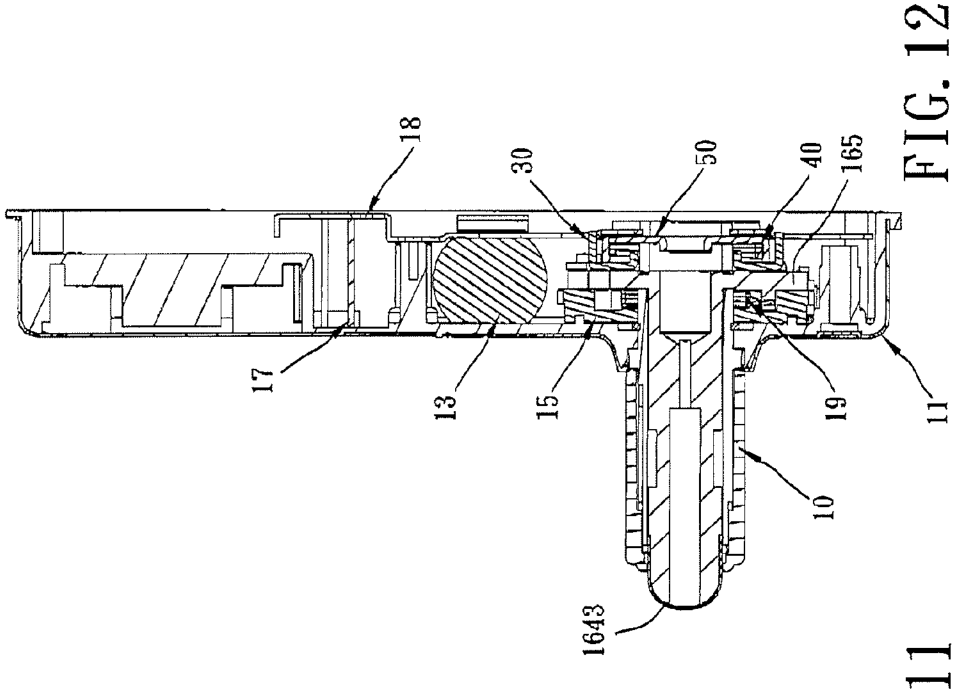
FIG. 12 is a sectional view taken along line 12-12 of FIG. 11.

Referring to FIGS. 2, 9 and 10, the rotary plate 50 includes a base plate 501 with a rectangular central engaging slot 502, two spaced apart first operating portions 505 projecting radially and outwardly from the base plate 501, two diametrically opposite side plates 507 each formed with a pressed portion 504 and a second operating portion 506. The legs 401 of the torsion spring 40 respectively rest on the pressed portions 504 of the side plates 507. The base plate 501 further has two arcuate slots 503 for engagement of the arcuate portions 1214 of the inner drive tube 12. Another snap ring 125 is disposed to engage the annular groove 1213 of the inner drive tube 12 near the first end 121. Since the operation of the torque restoring mechanism 20 is a hitherto known type, description on it is omitted herein.

The frame 18 is attached to the housing 11 to cover a portion of the receiving space 112. After the frame 18 is assembled with the housing 11, an inside lock assembly 1 is formed and may be mounted inside a door panel (not shown).

Referring to FIGS. 1 to 3, the electric door lock further comprises an outside lock assembly 3 which includes a cover disc 31, an outer handle 36, an outer drive tube 37 inserted into the outer handle 36, two limit plates 38 disposed transversely within the outer drive tube 37, a key-operated lock 32 mounted inside the outer drive tube 37, and an outer torque restoring mechanism 39 coupled to the outer drive tube 37. A controller input unit 34 is disposed on the cover disc 31 and is connected electrically to the electronic control unit 17. The outer drive tube 37 is connected to a middle drive tube 35 that has a square cross-section. The middle drive tube 35 extends through a square hole 23 in a driving member 22 of a latch unit 2, and is inserted into the central engaging slot 502 of the rotary plate 50. The limit plates 38 are movable between a locking position where the limit plates 38 project outwardly through apertures 371 of the outer drive tube 37 to engage a portion (not shown) of the cover disc 31, and an unlocking position where the limit plates 38 retract into the outer drive tube 37. The outer drive tube 37 is locked against rotation when the limit plates 38 project outward and is unlocked when the limit plates 37 move inward. The middle drive tube 35 may be rotated through the inner and outer drive tubes 12, 37 to move a latch bolt 24 of the latch unit 2 between latching and unlatching positions. Since the construction and operation of the outside handle assembly 3 are known, the details thereof are omitted herein.

An operating shaft 33 extends through the middle drive tube 35 and the limit plates 38, and has an inner end which is fitted in the rectangular hole section 1642 of the insertion hole 1641 of the spindle 164 so as to be connected drivenly to the spindle 164, and an outer end connected drivenly to the key-operated lock 32. Accordingly, the operating shaft 33 can be rotated between a vertical unlocking position (see FIG. 13) and a horizontal locking position (see FIG. 14) through the key-operated lock 32 and the operating end 1643 of the spindle 164. When the operating shaft 33 is rotated, the limit plates 38 are moved to its locking or unlocking position.

Referring to FIGS. 1 and 2, the latch unit 2 is first mounted on the door (not shown). Subsequently, the outside lock assembly 3 and a positioning plate 5 are respectively fixed on the outside and inside of the door by means of two screw fasteners 53. Thereafter, the housing 11 with those component parts of the inside lock assembly 1 received therein is fixed on the positioning plate 5 by means of three screw fasteners 53. Finally, upper and lower shells 52, 51 are mounted on the housing 11, and the inner handle 10 is mounted on the inner drive tube 12.

Figure 13:
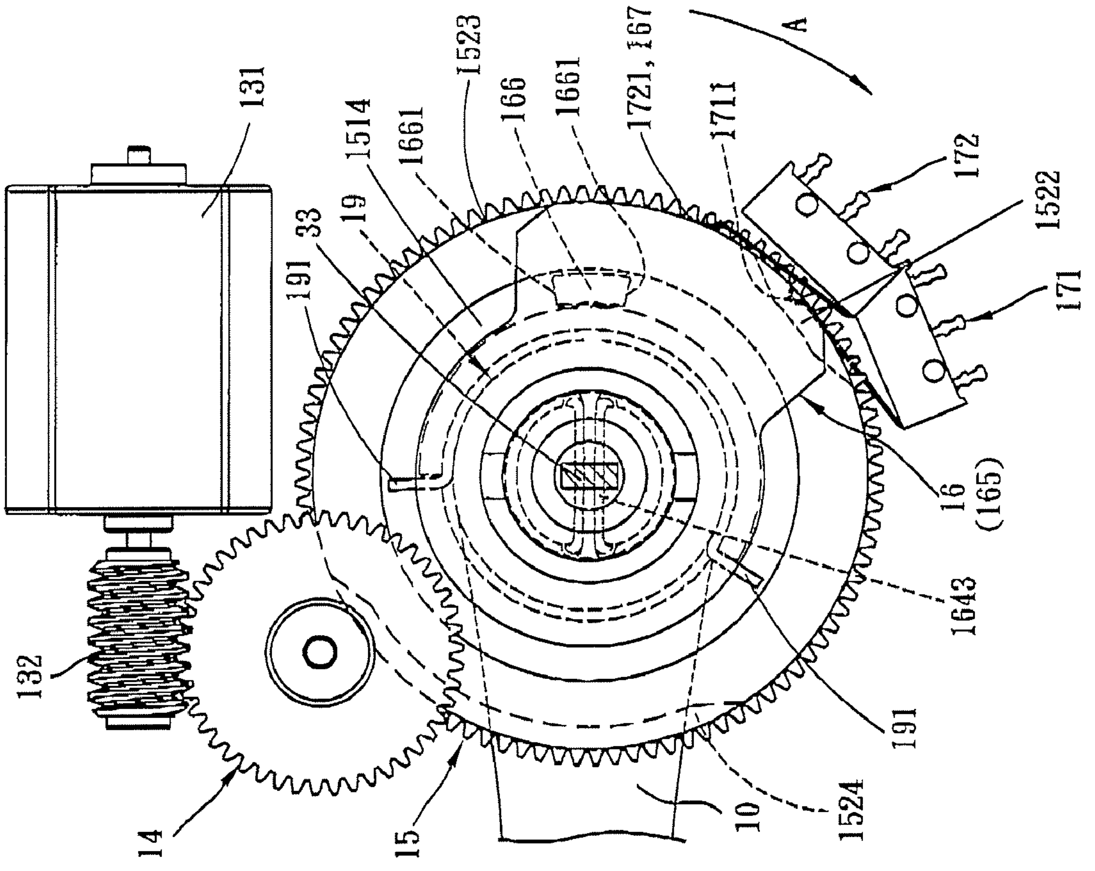
FIG. 13 is a schematic view illustrating that an operating shaft is in its unlocking position and the transmission wheel is in its original position.
Figure 14:
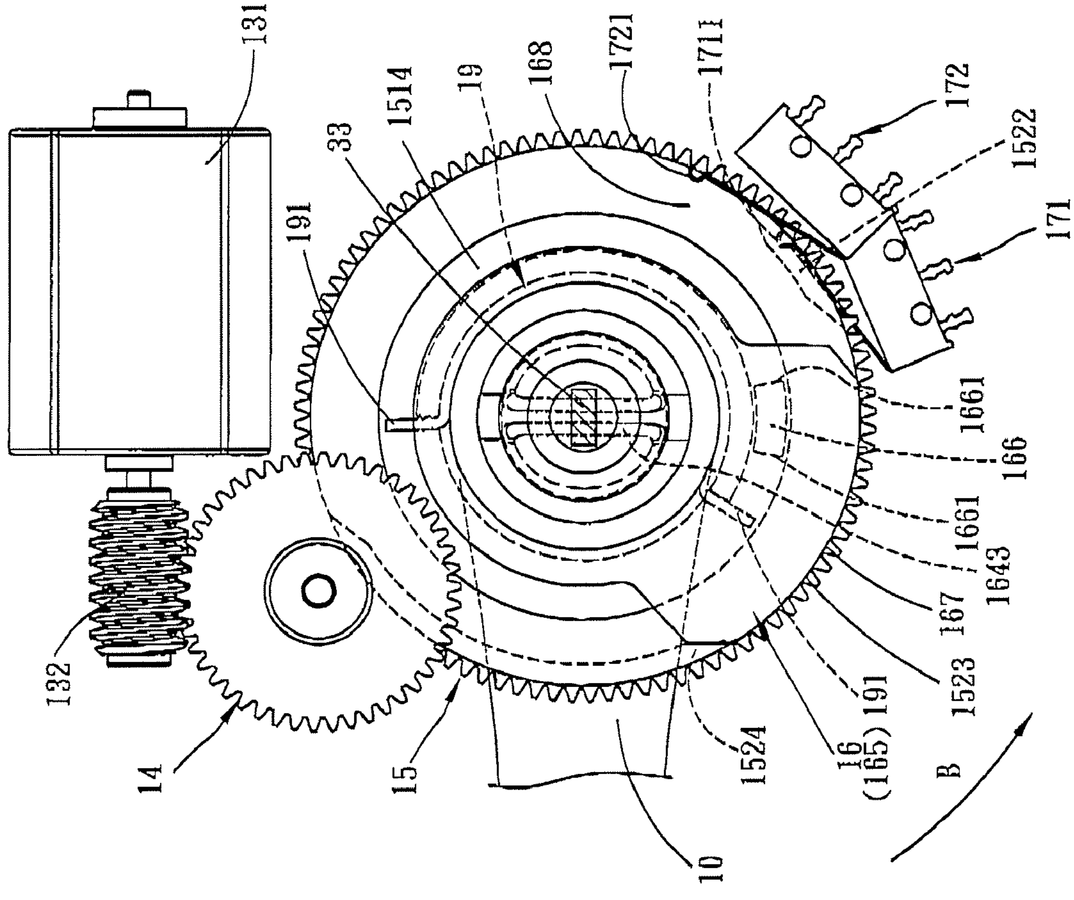
FIG. 14 shows that the operating shaft is in its locking position and the transmission wheel is in its original position.
Figure 15:
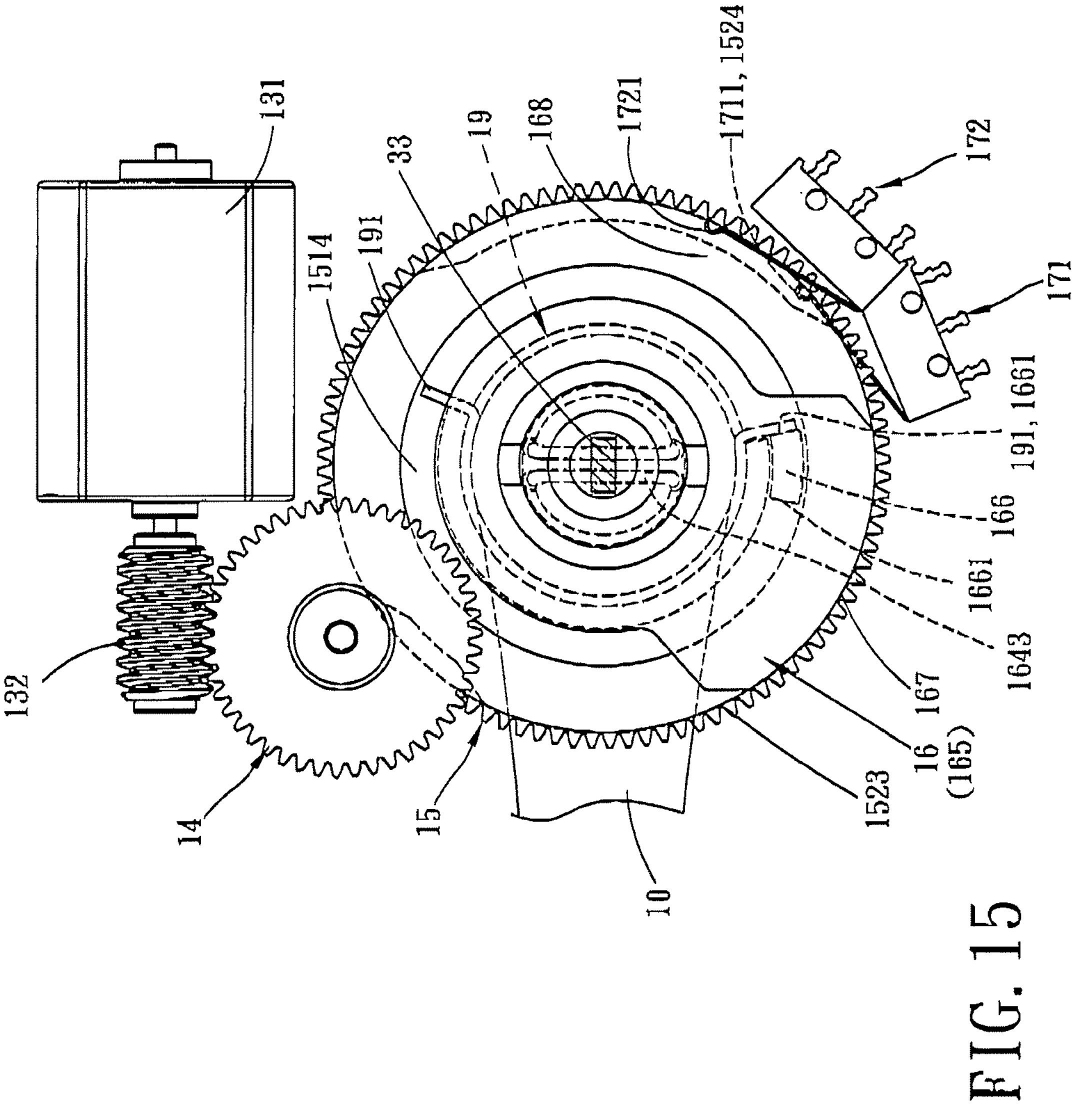
FIG. 15 shows that the operating shaft is in its locking position and the transmission wheel is in its final position.
Figure 16:
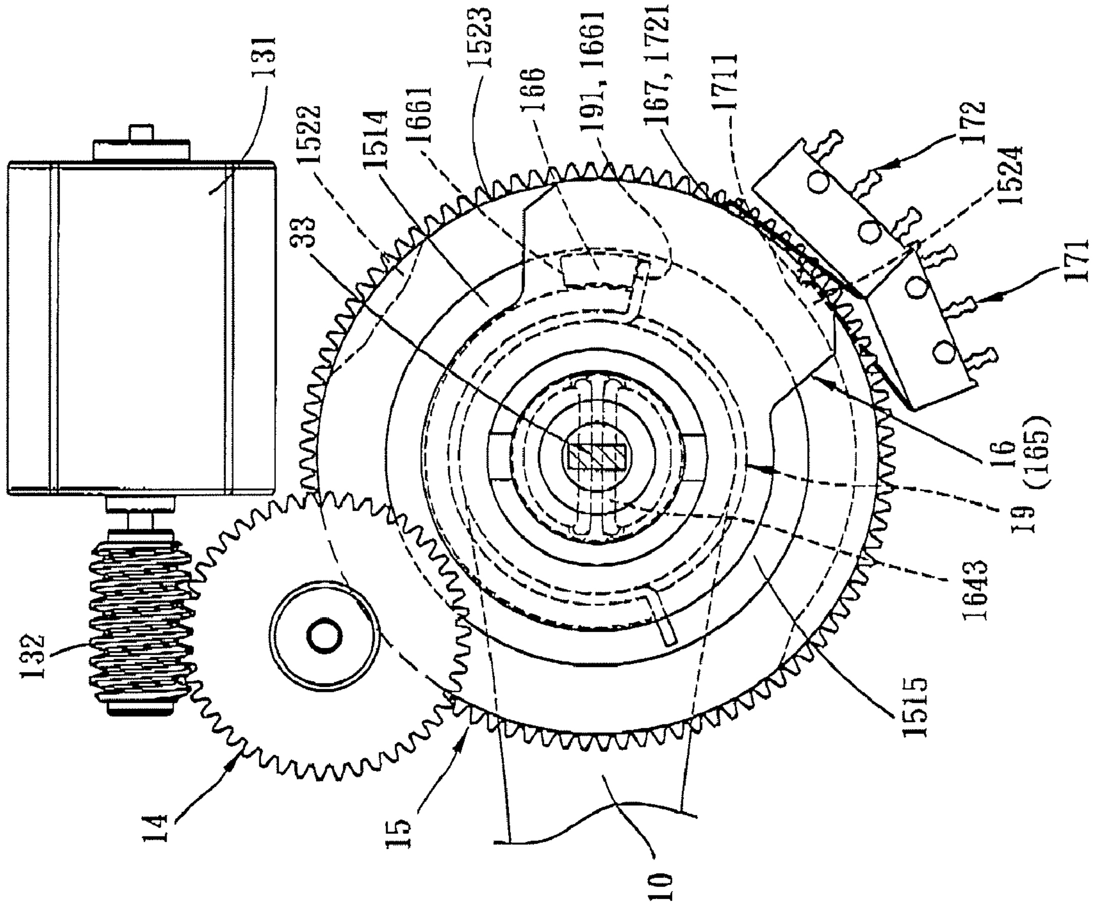
FIG. 16 shows that the operating shaft is in its unlocking position and the transmission wheel is in its final position.

Referring to FIGS. 2, 13 and 14, the electric door lock is operated to move the operating shaft 33 from the vertical unlocking position (FIG. 13) to the horizontal locking position (FIG. 14) by rotating the operating end 1643 of the spindle 164 or by operating the key-operated lock 32 with a key. The driven wheel unit 16 is thus rotated in a clockwise direction (A) in FIG. 13. The transmission wheel 15 is not rotated at this stage while the block 166 slides within the first arc-shaped groove 1514 from a first position (FIG. 13) to a second position (FIG. 14).

When the operating end 1643 of the spindle 164 is rotated or the key-operated lock 32 is operated with a key in a counterclockwise direction (B) in FIG. 14 to move the operating shaft 33 from the horizontal locking position to the vertical unlocking position, the block 166 slides within the first arc-shaped groove 1514 from the second position (FIG. 14) to the first position (FIG. 13).

Referring to FIGS. 2, 13, 14 and 15, the operating shaft 33 is moved from the vertical unlocking position (FIG. 13) to the horizontal locking position (FIG. 14) by operating the controller input unit 34 so that the electronic control unit 17 activates the motor 131. Accordingly, the transmission wheel 15 rotates in the clockwise direction (A) from its original position, and one driving end 191 of the torsion spring 19 is moved in a direction towards the block 166. During the rotation of the transmission wheel 15, as the first arcuate projection 1523 of the transmission wheel 15 is in contact with the first contact 1711 of the first sensor switch 171, the motor 131 is activated to rotate the transmission wheel 15 continuously. Therefore, one driven face 1661 of the block 166 is pushed by the driving end 191, thereby rotating the driven wheel unit 16 clockwise. Once the second cutout 1524 is registered with the first contact 1711 (FIG. 15), the electronic control unit 17 deactivates the motor 131, the transmission wheel 15 stops at its final position. Thereafter, the electronic control unit 17 controls the motor 131 to reverse the rotation direction thereof so that the transmission wheel 15 rotates counterclockwise and moves back to its original position, where the first cutout 1522 is registered with the first contact 1711 (FIG. 14).

Referring to FIGS. 2, 13, 14 and 16, the operating shaft 33 is moved from the horizontal locking position (FIG. 14) to the horizontal locking position (FIG. 13) by operating the controller input unit 34 to activate the motor 131 and to thereby rotate the transmission wheel 15 in the counterclockwise direction (B).

Figure 17:
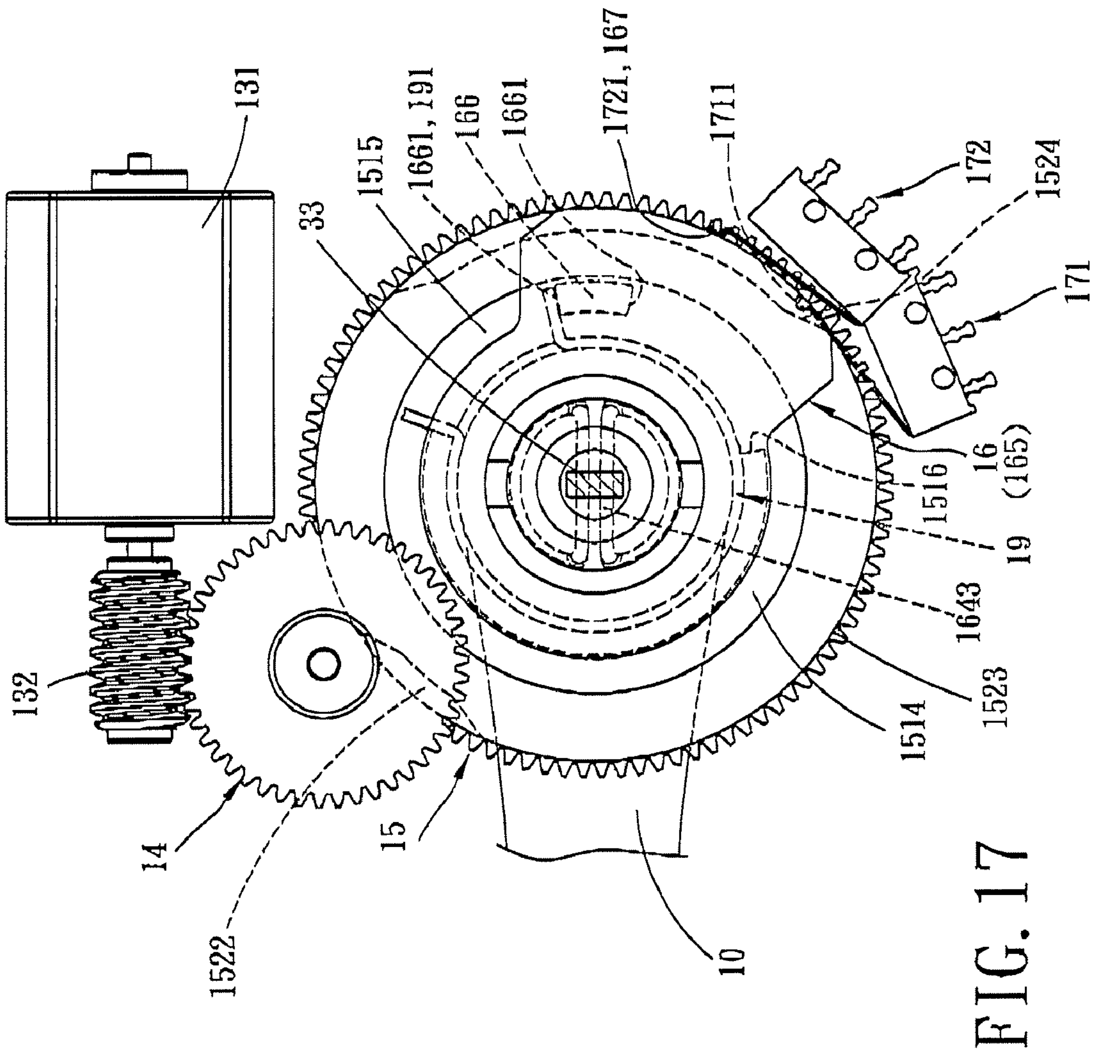
FIG. 17 shows that the operating shaft is in its unlocking position and cannot move to its locking position due to an obstruction force.

Referring to FIGS. 2, 13 and 17, when the operating shaft 33 is in its vertical unlocking position (FIG. 13), and is jammed due to an obstruction force that obstructs the operating end 1643 from rotating, the electric door lock of this invention permits the transmission wheel 15 to operate normally without malfunctioning. The electronic control unit 17 is operated through the controller input unit 34 to activate the motor 131 to thereby rotate clockwise the transmission wheel 15 which is at its original position. One driving end 191 pushes the corresponding driven face 1661 of the block 166. Since the operating end 1643 or the operating shaft 33 cannot rotate due to the obstruction force, and since the driving end 191 is resiliently movable relative to the transmission wheel 15 in an angular direction opposite to a rotation direction of the transmission wheel 15, when the driving end 191 is limited from rotation clockwise by the block 166 which is not rotatable, the driving end 191 permits the transmission wheel 15 to rotate clockwise without being obstructed. On the other hand, as the bearing face 1516 rotates clockwise together with the transmission wheel 15, the bearing face 1516 is moved away from the driving end 191, as shown in FIG. 17. Rotation of the transmission wheel 15 stops when the first contact 1711 is registered with the second cutout 1524 and is not pressed by the second cutout 1524. At this stage, as the second arcuate projection 167 constantly contacts the second contact 1721, the second sensor switch 172 does not detect the arcuate cutout 168 or any positional change of the driven wheel 165, and the operating shaft 33 does not move to its locking position. As a result, the electronic control unit 17 generates an error or alarm signal in terms of an audio or video signal to notify the user that the latch bolt 24 did not move to its locking position or that the transmission wheel 15 must rotate counterclockwise to move to its original position where the first cutout 1522 is registered with the first contact 1711 of the first sensor switch 171 (FIG. 13).

Figure 18:
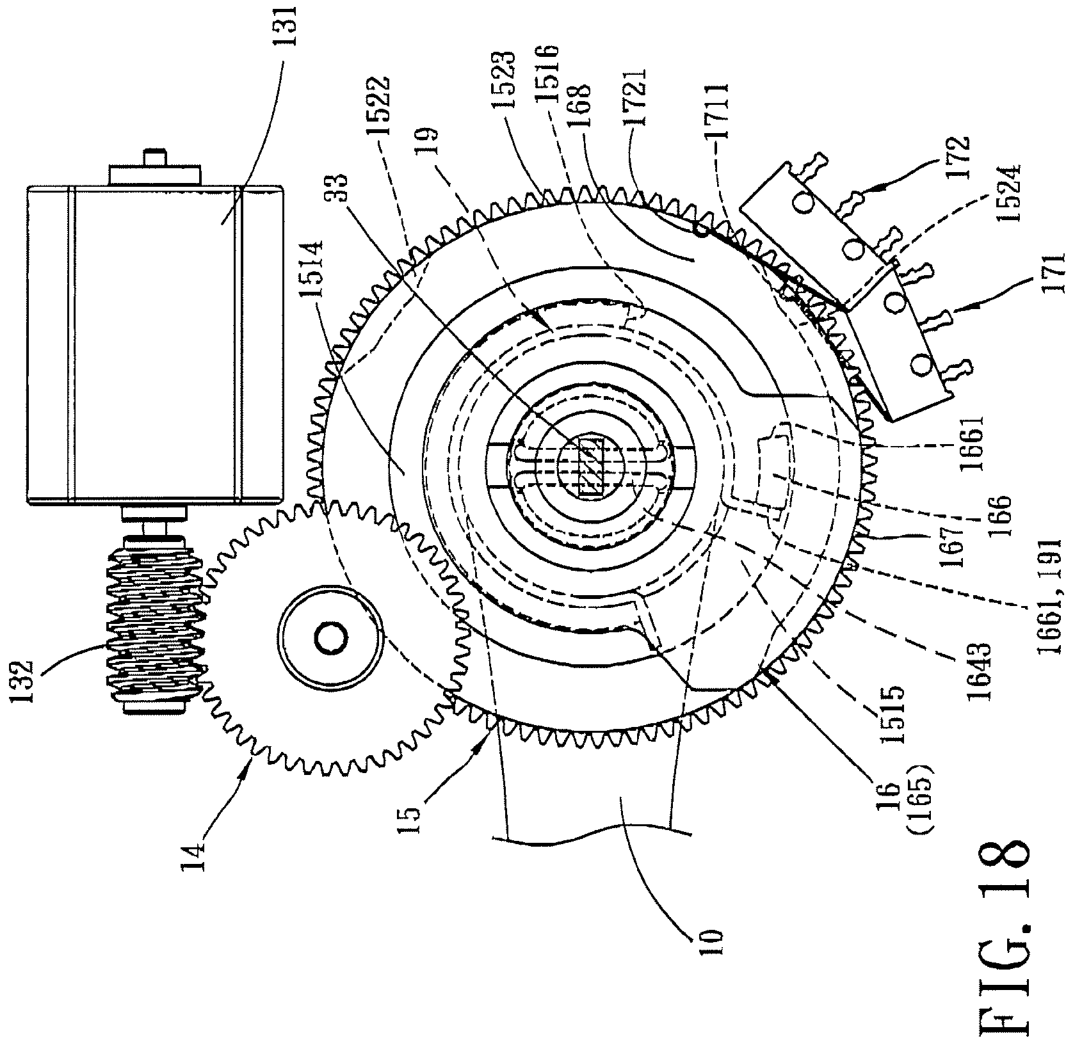
FIG. 18 shows that the operating shaft is in its locking position and cannot move to its unlocking position due to an obstruction force.

Referring to FIGS. 2, 14 and 18, when the operating shaft 33 is in its vertical locking position (FIG. 14), and is jammed due to an obstruction force that obstructs the operating end 1643 from rotating, the operating shaft 33 and the driven wheel unit 16 will not rotate during the counterclockwise rotation of the transmission wheel 15 by operation of the motor 131. In this case, the bearing face 1516 is moved away from the driving end 191, as shown in FIG. 18. Rotation of the transmission wheel 15 stops when the first contact 1711 is registered with and not pressed by the second cutout 1524. As the arcuate cutout 168 is registered with the second contact 1721, the second sensor switch 172 does not detect the second arcuate projection 167 or any positional change of the driven wheel 165. As a result, the electronic control unit 17 generates an error signal to notify the user that the operating shaft 33 did not move to its unlocking position or that the transmission wheel 15 must rotate clockwise to move to its original position where the first cutout 1522 is registered with the first contact 1711 of the first sensor switch 171 (FIG. 14).

Figure 19:
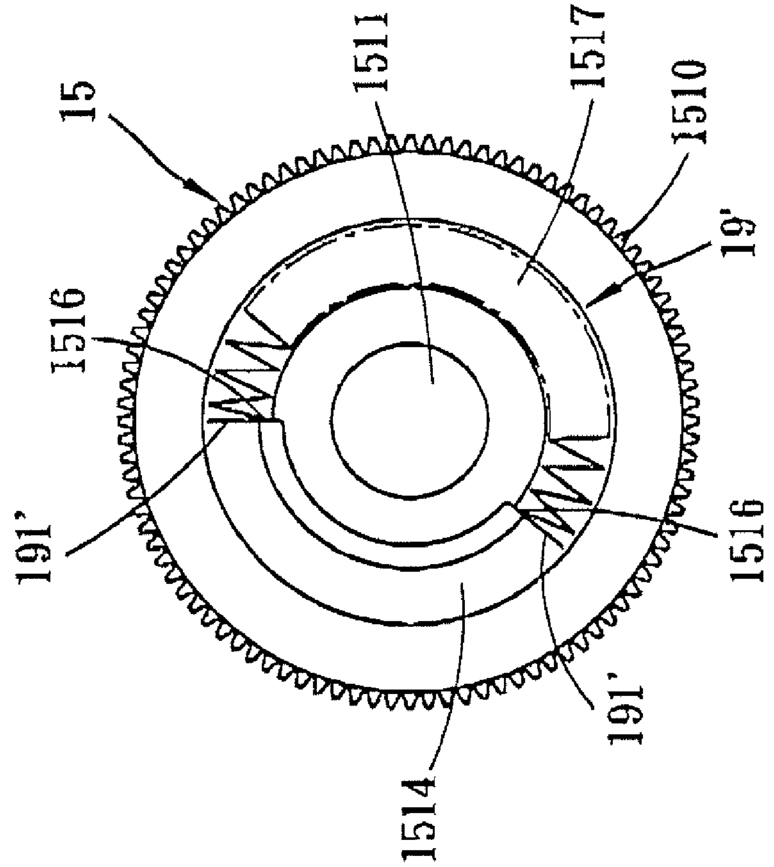
FIG. 19 shows a compression spring attached to the transmission wheel in place of a torsion spring.

Referring to FIG. 19, a compression spring 19' is attached to the transmission wheel 15 in place of the torsion spring 19, and has two driving ends 191' abutting against the bearing faces 1516, respectively.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. An electric door lock comprising:

a latch unit;

an inner handle;

an inner drive tube inserted into said inner handle;

an outer handle;

an outer drive tube inserted into said outer handle;

a key-operated lock mounted inside said outer drive tube;

a spindle inserted into said inner drive tube and said inner handle and including an operating end exposed from an inner end of said inner handle;

a middle drive tube having two ends connected respectively to said inner and outer drive tubes, said middle drive tube extending through said latch unit to move said latch unit;

an operating shaft extending through said middle drive tube, and having an inner end connected drivenly to said spindle and an outer end connected drivenly to said key-operated lock;

a motor;

a transmission wheel rotatably sleeved around said inner drive tube and connected drivenly to said motor;

a spring attached to said transmission wheel and having at least one driving end; and a driven wheel rotatably sleeved around said inner drive tube in proximity to said transmission wheel, and having a driven element driven by said driving end, said driven wheel being connected integrally to said spindle for rotation.

2. The electric door lock of claim 1, wherein said spindle further includes a connecting end that is opposite to said operating end and that stays within said inner drive tube, said driven wheel including an annular disc that has an inner periphery defining a sleeve hole, and at least one coupling piece projecting from said inner periphery into said sleeve hole, said connecting end of said spindle extending into said sleeve hole and being connected integrally to said coupling piece, said inner drive tube extending through a gap formed between said inner periphery of said annular disc and said connecting end of said spindle.

3. The electric door lock of claim 2, wherein said spindle further includes an insertion hole that opens at said connecting end, said inner end of said operating shaft being inserted into said insertion hole.

4. The electric door lock of claim 3, wherein said insertion hole has a rectangular hole section, said inner end of said operating shaft being fitted in said rectangular hole section.

5. The electric door lock of claim 2, wherein said inner drive tube has a first end extending through said gap, a second end proximate to said operating end of said spindle, at least one axial slot that opens at said first end and that extends axially towards said second end, and an arc-shaped slot extending circumferentially near said first end and communicated with said axial slot, said coupling piece of said driven wheel extending substantially radially through said arc-shaped slot.

6. The electric door lock of claim 5, wherein said coupling piece is formed as one piece with said annular disc and said connecting end of said spindle.

7. An electric door lock comprising:

an inner handle;

an inner drive tube inserted into said inner handle;

a spindle inserted into said inner drive tube and including an operating end exposed from said inner handle;

a motor;

a drive wheel connected drivenly to said motor;

a transmission wheel rotatably sleeved around said inner drive tube and connected drivenly to said drive wheel;

a spring attached to said transmission wheel and having two angularly spaced apart driving ends; and a driven wheel rotatably sleeved around said inner drive tube in proximity of said transmission wheel, and having a driven element disposed between and driven by at least one of said driving ends, said driven wheel being connected integrally to said spindle for rotation.

8. The electric door lock of claim 7, wherein said spindle is integrally formed with said driven wheel as one piece.

9. The electric door lock of claim 7, wherein said transmission wheel includes at least one bearing face, said driving end abutting against said bearing face.

10. The electric door lock of claim 7, wherein said spindle further includes a connecting end that is opposite to said operating end and that stays within said inner drive tube;

said driven wheel including an annular disc that has an inner periphery defining a sleeve hole, and at least one coupling piece projecting from said inner periphery into said sleeve hole;

said connecting end of said spindle extending into said sleeve hole and being connected integrally to said coupling piece.

11. The electric door lock of claim 10, wherein said inner drive tube has a first end extending through a gap formed between said inner periphery of said annular disc and said connecting end of said spindle, a second end proximate to said operating end of said spindle, at least one axial slot that opens at said first end and that extends axially towards said second end, and an arc-shaped slot extending circumferentially near said first end and communicated with said axial slot, said coupling piece of said driven wheel extending substantially radially from said inner periphery to said connecting end of said spindle through said arc-shaped slot.

12. The electric door lock of claim 7, wherein said transmission wheel has a first arcuate projection formed circumferentially thereon, said driven wheel having a second arcuate projection formed circumferentially thereon, said electric door lock further comprising an electronic control unit connected to said motor and having a first sensor switch proximate to said transmission wheel to be pressed by said first arcuate projection to activate said motor, and a second sensor switch proximate to said driven wheel to be pressed by said second arcuate projection to activate said motor.

13. An electric door lock comprising:

an inner handle an inner drive tube inserted into said inner handle;

a spindle inserted into said inner drive tube and including an operating end exposed from said inner handle, a connecting end opposite to said operating end and staying within said inner drive tube, and an insertion hole that opens at said connecting end and that extends from said connecting end towards said operating end;

a motor;

a transmission wheel rotatably sleeved around said inner drive tube and connected drivenly to said motor;

a spring attached to said transmission wheel and having at least one driving end; and a driven wheel including an annular disc that defines a sleeve hole and that is rotatably sleeved around said inner drive tube in proximity to said transmission wheel, a driven element disposed on said annular disc and driven by said driving end, and a coupling piece projecting from an inner periphery of said annular disc, extending through said inner drive tube, and connected integrally to said connecting end of said spindle.

14. The electric door lock of claim 13, wherein said inner drive tube has an arc-shaped slot extending circumferentially therein and proximate to said connecting end of said spindle, said coupling piece extending substantially radially through said arc-shaped slot and connected between said connecting end of said spindle and said annular disc.

* * * * *